United States Patent [19]
Wideman et al.

[11] Patent Number: 6,057,392
[45] Date of Patent: May 2, 2000

[54] THERMOMECHANICALLY MIXING RUBBER COMPOUNDS CONTAINING AN ALKYL ($C_{12}$-$C_{22}$) ESTER OF A FATTY ACID

[75] Inventors: Lawson Gibson Wideman; Paul Harry Sandstrom, both of Tallmadge, Ohio

[73] Assignee: The Goodyear Tire & Rubber Company, Akron, Ohio

[21] Appl. No.: 09/024,171

[22] Filed: Feb. 17, 1998

[51] Int. Cl.$^7$ .................................. C08J 3/20; C08L 9/00; C08C 19/25; C08C 19/00; C08C 19/20
[52] U.S. Cl. ...................... 524/318; 524/571; 524/575.5; 524/570; 524/566; 524/574; 525/332.6; 525/342; 525/346
[58] Field of Search ...................... 524/318, 571, 524/575.5, 570, 566, 574; 525/332.6, 342, 346

[56] References Cited

U.S. PATENT DOCUMENTS

| | | | |
|---|---|---|---|
| 3,873,489 | 3/1975 | Thurn et al. | 524/262 |
| 5,227,425 | 7/1993 | Rauline | 524/493 |
| 5,252,650 | 10/1993 | Wideman et al. | 524/318 |

*Primary Examiner*—Robert Dawson
*Assistant Examiner*—Kuo-Liang Peng
*Attorney, Agent, or Firm*—Bruce J Hendricks

[57] ABSTRACT

A method is disclosed for processing a rubber composition comprising thermomechanically mixing the rubber composition while maintaining a rubber temperature in a range of from 160° C. to 190° C. for a period of time ranging from 4 to 8 minutes, wherein said rubber composition is characterized by (i) 100 parts by weight of at least one sulfur vulcanizable elastomer containing olefinic unsaturation;

(ii) 10 to 250 phr of a filler selected from the group consisting of silica, carbon black and mixtures thereof; and (iii) 0.5 to 50 phr of an ester of the formula:

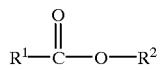

I wherein $R^1$ is selected from the group consisting of alkyls having from 16 to 18 carbon atoms and alkenyls and alkadienyls having from 16 to 18 carbon atoms; and $R^2$ is selected from the group consisting of alkyls having from 12 to 22 carbon atoms.

10 Claims, No Drawings

THERMOMECHANICALLY MIXING RUBBER COMPOUNDS CONTAINING AN ALKYL (C$_{12}$-C$_{22}$) ESTER OF A FATTY ACID

FIELD OF THE INVENTION

The present invention relates to a method of thermomechanically mixing a rubber compound containing an alkyl (C$_{12}$–C$_{22}$) ester of a fatty acid.

BACKGROUND OF THE INVENTION

U.S. Pat. No. 5,252,650 teaches the use in a rubber of an alkyl (C$_{12}$–C$_{22}$) esters of a mixture of fatty acids. The esters are useful as a total or partial replacement for extender or processing oil.

U.S. Pat. No. 5,227,425 teaches a thermomechanical mixing step of a rubber compound containing a sulfur containing organosilane wherein a rubber temperature of between 130° C. to 180° C. is maintained for a time period between 10 seconds to 20 minutes followed by addition of the vulcanization system at a lower temperature. It is believed that the thermal treatment during mixing promotes the sulfur linkages in the sulfur containing organosilicon compound to cleave forming bonds to the rubber and concomitant reaction of the alkoxy groups with the silica.

SUMMARY OF THE INVENTION

The present invention relates to a process of thermomechanically mixing a rubber compound containing an alkyl (C$_{12}$–C$_{22}$) ester of a fatty acid while maintaining a rubber temperature of from 160° C. to 190° C. for a period of time ranging from 4 to 7 minutes.

DETAILED DESCRIPTION OF THE INVENTION

There is disclosed a method for processing a rubber composition which comprises thermomechanically mixing the rubber composition while maintaining a rubber temperature in a range of from 160° C. to 190° C. for a period of time ranging from 4 to 8 minutes, wherein said rubber composition is characterized by (i) 100 parts by weight of at least one sulfur vulcanizable elastomer containing olefinic unsaturation;

(ii) 10 to 250 phr of a filler selected from the group consisting of silica, carbon black and mixtures thereof; and (iii) 0.5 to 50 phr of an ester of the formula:

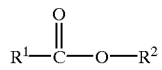

I wherein R$^1$ is selected from the group consisting of alkyls having from 16 to 18 carbon atoms and alkenyls and alkadienyls having from 16 to 18 carbon atoms; and R$^2$ is selected from the group consisting of alkyls having from 12 to 22 carbon atoms.

The present invention may be used to process sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer".

The esters for use in the present invention are of the formula:

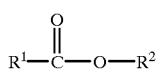

I wherein $R^1$ is selected from the group consisting of alkyls having from 16 to 18 carbon atoms and alkenyls and alkadienyls having from 16 to 18 carbon atoms; and $R^2$ is selected from the group consisting of alkyls having from 12 to 22 carbon atoms. Preferably, $R^1$ is an alkenyl having 17 carbon atoms and $R^2$ is an alkyl having 18 carbon atoms.

The ester is added to the rubber composition in an amount ranging from about 0.5 to 50 phr. Preferably, the amount is from 1 to 30 phr.

To form the esters of Formula I, a fatty acid is reacted with an aliphatic alcohol having from about 12 to about 22 carbon atoms under esterification conditions. Therefore, the $C_{12}$–$C_{22}$ alkyl group of the ester of a fatty acid is derived from the aliphatic alcohol. Representative of the aliphatic alcohols which may be used in the present invention include dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, heneicosyl alcohol, docosyl alcohol or mixtures thereof. Preferably the aliphatic alcohol is dodecyl alcohol, hexadecyl alcohol or octadecyl alcohol.

The fatty acids generally have from 16 to 18 carbon atoms. Representative examples include stearic acid, oleic acid, palmitic acid and mixtures thereof. One preferred mixture of such acid may contain from about 2 to 67 percent by weight of stearic acid, 0.3 to 48 percent of oleic acid and 0.1 to 49 percent by weight of palmitic acid. A particularly preferred mixture contains from about 34 to 60 percent by weight of stearic acid, 0.5 to 8 percent by weight of oleic acid, and 5 to 49 percent by weight of palmitic acid. In addition to these three fatty acids, the mixture may contain 9,12-linoleic acid, 9,11-linoleic acid (conjugated linoleic acid), pinolenic acid, palmitoleic acid, magaric acid, octadecadienoic acid, octadecatrienoic acid and the like. The above fatty acids other than the three major fatty acids may comprise from about 0 to 50 percent by weight of the overall fatty acid mixture. In addition to the fatty acids, the fatty acid or mixture thereof may contain minor amounts of rosin acids. Rosin acids that are generally found in tall oil fatty acid mixtures may include abietic acid, dihydroabietic acid, palustric/levopimaric acid, pimaric acids, tetrahydroabietic acid, isopimaric acid, neoabietic acid, and the like. The respective weight percentages of the fatty acids may be determined according to ASTM D-803-65. The respective weight percentages of the rosin acids may be determined by ASTM D-1240-54.

The mole ratio of the fatty acid to aliphatic alcohol may vary. Generally, the mole ratio of fatty acid to aliphatic alcohol will range from about 0.5 to about 1.5. Preferably the mole ratio of fatty acid to aliphatic alcohol is from about 0.6 to about 1.0.

An organic solvent may be used to dissolve the fatty acid, to increase heat transfer and to facilitate water removal through a reflux trap. The solvent is preferably inert to the esterification reaction. Illustrative of solvents suitable for use in the practice of this invention include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the fatty acids and not interfere with the esterification reaction.

The esterification reaction may be conducted in the presence of a catalyst to speed up the reaction. Examples of catalysts that may be used include condensation catalysts, e.g., dibutyltin oxide or butyl stannoic acid. In addition acid catalysts may be used such as sulfuric acid, hydrochloric acid and toluenesulfonic acid. The amount of catalyst that is used will vary depending on the particular catalyst that is selected. For example, when an acid catalyst is used, from about 5 weight percent to about 10 weight percent is recommended.

The esterification reaction may be conducted over a variety of temperature ranges and pressures. The temperatures may range from moderate to an elevated temperature. In general, the esterification reaction may be conducted at a temperature ranging from about 100° C. to about 250° C. In most cases, when operating at the lower end of the temperature range, it is desirable to utilize pressures at the higher end of the range. The preferred temperature range is from about 110° C. to about 200° C., while the most preferred temperature range is from about 120° C. to about 190° C.

The esterification reaction may be conducted over a variety of pressures. Preferably the reaction is conducted at a pressure range of from about 0 to about 100 psig.

The esterification reaction is conducted for a period of time sufficient to produce the desired alkyl ester of the fatty acid. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, if any, reaction pressure, concentration and choice of solvent, and other factors.

The esterification reaction may be carried out in a batch, semi-continuous or continuous manner. The esterification reaction may be conducted in a single reaction zone or in a plurality of reaction zones, in series or in parallel. The reaction may be conducted intermittently or continuously. The reaction may be conducted in a vessel equipped with a thermometer, stirrer and a distillation column to separate water that distills from reactants and optionally a Dean Stark trap. The reactor may be fitted with internal and/or external heat exchangers to control temperature fluctuations. Preferably, an agitation means is available to ensure a uniform reaction. Mixing induced by vibration, shaker, stirrer, rotating, oscillation, etc. are all illustrative of the types of agitation means which are contemplated for use in the esterification reaction. Such agitation means are available and well known to those skilled in the art.

The amount of such alkyl ester may vary widely depending on the type of rubber and other compounds present in the vulcanizable composition. Generally, the amount of such alkyl ester is in a range of from about 0.5 to about 50 phr with a range of 1 to about 30 phr being preferred. This material should be added in the nonproductive stage with the filler.

The esters of Formula I are typically solid and may be used per se or may be deposited on suitable carriers. Examples of carriers which may be used in the present invention include silica, carbon black, alumina, kieselguhr, silica gel and calcium silicate.

A critical feature of the present invention is the rubber composition containing the ester of Formula I must be subjected to a thermomechanical mixing step. The thermomechanical mixing step generally comprises a mechanical working in a mixer or extruder for a period of time suitable in order to produce a rubber temperature between 160° C. and 190° C. The appropriate duration of the thermomechanical working varies as a function of the operating conditions and the volume and nature of the components. For example, the thermomechanical working at the rubber temperature of from 160° C. to 190° C. generally ranges from 4 to 8 minutes. Preferably, the rubber is maintained at from 160 to 190° C. for 5 to 7 minutes.

The rubber composition contains a filler in amounts ranging from 10 to 250 phr. Preferably, the filler is present in an amount ranging from 20 to 100 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

The processing of the rubber, especially when silica is present, may be conducted in the presence of a sulfur containing organosilicon compound. Examples of suitable sulfur containing organosilicon compounds are of the formula:

in which Z is selected from the group consisting of

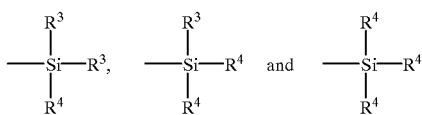

where $R^3$ is an alkyl group of 1 to 4 carbon atoms, cyclohexyl or phenyl;

$R^4$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis (triethoxysilylpropyl) tetrasulfide. Therefore as to Formula II, preferably Z is

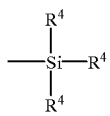

where $R^4$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

Typically, the sulfur containing organosilicon compounds of Formula II are used when silica is present in the rubber compound. The amount of the sulfur containing organosilicon compound of Formula II in a rubber composition will vary depending on the level of silica that is used. Generally speaking, the amount of the compound of Formula II will range from 0.01 to 1.0 parts by weight per part by weight of the silica. Preferably, the amount will range from 0.05 to 0.4 parts by weight per part by weight of the silica.

Commonly employed carbon blacks can be used as the carbon black in this invention. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

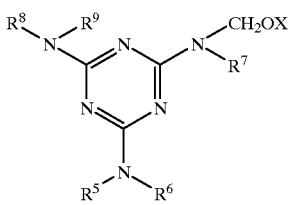

wherein X is an alkyl having from 1 to 8 carbon atoms, $R^5$, $R^6$, $R^7$, $R^8$ and $R^9$ are individually selected from the group consisting of hydrogen, an alkyl having from 1 to 8 carbon atoms and the group —$CH_2OX$. Specific methylene donors include hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, filler, ester of Formula I, optional sulfur containing organosilicon and ester of Formula I are mixed in one or more non-productive mix stages. The terms "non-productive" and "productive" mix stages are well known to those having skill in the rubber mixing art.

Upon vulcanization, the sulfur vulcanized composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE 1

Preparation of Stearyl Stearate

A 2-liter round-bottom flask was charged with 142 g (0.5 mole) of rubber-maker's technical grade stearic acid, 203 g (0.75 mole) of 1-octadecanol, 11 g of p-toluenesulfonic acid and 200 ml of mixed xylenes. Rubber-maker's technical grade stearic acid typically contains approximately 56 percent by weight stearic acid, 29 percent by weight palmitic acid, 8 percent by weight oleic acid and 7 percent by weight other fatty acids. The flask was fitted with a Dean-Stark trap for water removal, a heating mantel and a thermocouple. The system was flushed with nitrogen and heated to a pot temperature of 180° C. for about 1 hour, wherein 12 ml of water were removed. Volatiles were removed under 29 inches of vacuum at 110° C. to give 342 g of a waxy solid melting at 47–55° C. and giving an infrared spectrum showing loss of hydroxyl absorption bands and formation of ester carbonyl functions.

EXAMPLE 2

In this example, rubber compositions prepared without thermomechanically mixing are evaluated both with and without the ester of Example 1.

Rubber compositions containing the materials set out in Table I was prepared in a BR Banbury™ mixer using three separate stages of addition (mixing); namely, two non-productive mix stages and one productive mix stage. The mixing time and rubber temperatures for the first nonproductive stage was for 2.5 minutes to a drop temperature of 150° C. The mixing time and rubber temperatures for the second nonproductive was for 2.5 minutes to a drop temperature of 150° C. The mixing time and rubber temperature for the productive stage was for 2 minutes to a drop temperature of 105° C. The level of each ingredient is set forth in Table I.

The rubber compositions are identified herein as Samples 1 and 2. Each of these two samples are considered herein as being controls because of the absence of its required thermomechanical mixing step.

The samples were cured at about 150° C. for about 36 minutes.

Table I also illustrates the behavior and physical properties of the cured samples 1 and 2.

TABLE I

| Sample No. | 1 | 2 |
| --- | --- | --- |
| 1st Nonproductive | | |
| Polyisoprene[1] | 100 | 100 |
| CB | 15 | 15 |
| Silica | 20 | 20 |
| Coupler (50%) | 3 | 3 |
| Antioxidant | 2 | 2 |
| Processing Oil | 5 | 0 |
| Ester of Ex. 1 | 0 | 5 |
| Stearic Acid | 2 | 2 |
| 2nd Nonproductive | | |
| Silica | 15 | 15 |
| Coupler[2] (50%) | 2 | 2 |
| Productive | | |
| Accelerator[3] (TBS) | 2.0 | 2.0 |
| Accelerator (DPG) | 0.5 | 0.5 |
| Sulfur | 1.5 | 1.5 |
| Max Torque | 44 | 42.8 |
| Min Torque | 4.8 | 4.5 |
| Δ Torque | 39.2 | 38.3 |
| $T_1$ (min) | 8 | 7.5 |
| $T_{25}$ (min) | 11.8 | 11.5 |
| $T_{90}$ | 15.8 | 15.5 |
| Tensile Strength (MPa) | 20.4 | 21.5 |
| Elongation Break (%) | 483 | 510 |
| 100% Modulus (MPa) | 2.74 | 2.81 |
| 300% Modulus (MPa) | 12.10 | 11.87 |
| Hardness | | |
| Room Temperature | 66.0 | 68.1 |
| 100° C. | 63.4 | 62.7 |
| Rebound Room Temperature | 54.1 | 49.6 |
| 100° C. (6%) | 68.8 | 69.4 |
| Strebler to Itself 95° C. (N) | 80 | 95 |
| DIN Abrasion | 106 | 131 |
| E' @ 60° C. (MPa) | 21.4 | 18.7 |
| Tan Δ @ 60° C. | .051 | .050 |

[1]Polyisoprene commercially available from the Goodyear Tire & Rubber Company under the designation Natsyn ® 2200.
[2]Obtained as bis-(3-triethoxysilylpropyl)tetrasulfide, commercially available as X50S from Degussa Gmbh which is provided in a 50/50 blend with carbon black and thus considered as being 50 percent active when the blend is considered.
[3]Ntertiary butyl-2-benzothiazyl sulfenamide
[4]Diphenylguanidine The replacement of processing oil with the stearyl stearate ester gave no significant improvement in any of the measured physical properties. In particular, the DIN abrasion value for Sample No. 2 which contained the ester was higher (Inferior abrasion) than Sample No. 1 which contained the processing oil. The absence of a higher temperature mixing step resulted in an inferior performance for the ester containing compound.

EXAMPLE 3

In this example, rubber compositions prepared with thermomechanical mixing are evaluated both with and without the ester of Example 1.

Rubber compositions containing the materials set out in Table I were prepared in a BR Banbury™ mixer using three stages of addition (mixing); namely, two non-productive mix stages and one productive mix stage. The mixing time and rubber temperature for the first nonproductive stage was for 2.5 minutes to a drop temperature of 150° C. The mixing time and rubber temperature for the second nonproductive stage was for 8 minutes—one minute to reach 160° C. and then 7 minutes at 160° C. The mixing time and rubber temperature for the productive stage was for 2 minutes to a drop temperature of 105° C.

The level of each ingredient is set forth in Table II. The rubber compositions are identified herein as Samples 3–7. Samples 3–5 are considered herein as being controls because of the absence of an ester of Formula I.

The samples were cured at about 150° C. for about 36 minutes.

Table III illustrates the behavior and physical properties of the cured samples 3–7.

Samples 6 and 7 which contain 5 and 10 phr stearyl stearate, respectively, exhibit a significant improvement in DIN abrasion (lower is better) than the corresponding controls 4 and 5. In this example, the heat treatment step in the Banbury (7 minutes mixing at 160° C.) provided superior abrasion for the stearyl stearate in contrast to the previous example where the heat treatment was not used during mixing.

TABLE II

| 1st Non-Productive | |
| --- | --- |
| Styrene/Butadiene Rubber[1] | 68.75 |
| Cis 1,4-Polybutadiene[2] Rubber | 15.00 |
| Cis 1,4-Polyisoprene[3] Rubber | 35.00 |
| Carbon Black | 20.00 |
| Silica[4] | 40.00 |
| Zinc Oxide | 3.00 |
| Fatty Acid | 3.00 |
| Antioxidant[5] | 2.00 |
| Zn soaps of fatty acids[6] | Varied |
| Ester of Ex. 1[7] | Varied |
| 2nd Non-Productive | |
| Silica[4] | 30.00 |
| Bis-(3-triethoxysilylpropyl) tetrasulfide[8] (50% active) | Varied |
| Productive | |
| Sulfur | 1.4 |
| Accelerator, Sulfenamide Type | 1.8 |
| Diphenylguanidine | 1.5 |

[1]Emulsion polymerization prepared styrene/butadiene copolymer elastomer (SBR 1712) containing 23.4 percent bound styrene and 37.5 phr aromatic oil from The Goodyear Tire & Rubber Company
[2]High cis 1,4-polybutadiene rubber (BUD 1207) from The Goodyear Tire & Rubber Company
[3]Synthetic cis 1,4-polyisoprene rubber (NAT 2200) from The Goodyear Tire & Rubber Company
[4]Zeosil 1165 MP from Rhone-Poulenc
[5]Polymerized 1,2-hydro-2,2,4-trimethylquinoline type
[6]Struktol A6, a mixture of zinc soaps of high molecular weight fatty acids
[7]Reaction product of Example 1 herein
[8]X50S, from Degussa GmbHThe Goodyear Tire & Rubber Company

TABLE III

| Sample No. | 3 | 4 | 5 | 6 | 7 |
| --- | --- | --- | --- | --- | --- |
| X50S Coupler | 0 | 7 | 7 | 7 | 7 |
| Struktol A6 | 5 | 5 | 10 | 0 | 0 |
| Stearyl Stearate | 0 | 0 | 0 | 5 | 10 |
| T25 (min) | 17.0 | 10.0 | 10.8 | 11.3 | 12.5 |
| T90 (min) | 24.0 | 14.5 | 16.5 | 16.3 | 17.8 |
| MAX Torque | 33.9 | 43.2 | 41.6 | 41.0 | 37.3 |
| MIN Torque | 12.0 | 11.0 | 9.8 | 13.0 | 11.0 |
| Δ Torque | 21.9 | 32.2 | 31.8 | 28.0 | 26.3 |
| Tensile Strength (MPa) | 13.6 | 16.9 | 16.1 | 17.6 | 17.3 |
| Elongation @ Break (%) | 731 | 461 | 474 | 502 | 551 |
| 100% Modulus | 1.06 | 2.65 | 2.78 | 2.45 | 2.34 |
| 300% Modulus | 3.52 | 11.6 | 10.8 | 10.6 | 9.43 |
| Hardness Room Temp | 54.5 | 68.5 | 70.5 | 69.6 | 69.3 |
| Hardness 100° C. | 47.3 | 63.3 | 61.8 | 62.3 | 60.0 |
| Rebound Room Temp (%) | 37.2 | 39.8 | 37.1 | 35.7 | 33.4 |
| Rebound 100° C. (%) | 48.1 | 57.3 | 57.7 | 52.2 | 52.4 |
| Strebler @ 95° C. (N) | 229 | 120 | 100 | 142 | 163 |

TABLE III-continued

| Sample No. | 3 | 4 | 5 | 6 | 7 |
|---|---|---|---|---|---|
| DIN Abrasion | 209 | 93 | 104 | 85 | 82 |
| E' @ 60° C. (MPa) | 11.2 | 21.5 | 23.2 | 20.0 | 17.9 |
| Tan Δ @ 60° C. | .109 | .082 | .074 | .095 | .105 |

EXAMPLE 4

In this example, rubber compositions prepared with thermomechanical mixing are evaluated both with and without the ester of Example 1.

Rubber compositions containing the materials set out in Table I were prepared in a BR Banbury™ mixer using three stages of addition (mixing); namely, two non-productive mix stages and one productive mix stage. The mixing time and rubber temperature for the first nonproductive stage was for 2.5 minutes to a drop temperature of 150° C. The mixing time and rubber temperature for the second nonproductive stage was for 6 minutes—one minute to reach 160° C. and then 5 minutes at 160° C. The mixing time and rubber temperature for the productive stage was for 2 minutes to a drop temperature of 105° C.

The level of each ingredient is set forth in Table IV. The rubber compositions are identified herein as Samples 8–11. Samples 8 and 10 are considered herein as being controls because of the absence of an ester of Formula I.

The samples were cured at about 150° C. for about 36 minutes.

Table V illustrates the behavior and physical properties of the cured samples 8–11.

TABLE IV

| Sample No. | 8 | 9 | 10 | 11 |
|---|---|---|---|---|
| First Nonproductive | | | | |
| Polyisoprene¹ | 100 | 100 | 0 | 0 |
| Emulsion SBR² | 0 | 0 | 100 | 100 |
| Carbon Black | 50 | 50 | 50 | 50 |
| Antioxidant | 2 | 2 | 2 | 2 |
| Zinc Oxide | 5 | 5 | 5 | 5 |
| Stearic Acid | 2 | 2 | 2 | 2 |
| Processing Oil³ | 5 | 0 | 5 | 0 |
| Stearyl Stearate | 0 | 5 | 0 | 5 |
| Second Nonproductive | | | | |
| Polyisoprene¹ | 100 | 100 | 0 | 0 |
| Emulsion SBR² | 0 | 0 | 100 | 100 |
| Carbon Black | 50 | 50 | 50 | 50 |
| Antioxidant | 2 | 2 | 2 | 2 |
| Zinc Oxide | 5 | 5 | 5 | 5 |
| Stearic Acid | 2 | 2 | 2 | 2 |
| Processing Oil³ | 5 | 0 | 5 | 0 |
| Stearyl Stearate | 0 | 5 | 0 | 5 |
| Productive | | | | |
| Accelerator (TBS)⁴ | 1.0 | 1.0 | 1.2 | 1.2 |
| Accelerator (DPG)⁵ | 0 | 0 | 1.0 | 1.0 |
| Sulfur | 1.4 | 1.4 | 1.0 | 1.0 |

TABLE V

| Sample No. | 8 | 9 | 10 | 11 |
|---|---|---|---|---|
| T25 (min) | 16.8 | 16.8 | 17.5 | 17.3 |
| T90 (min) | 21.3 | 21.3 | 26.5 | 26.5 |
| MAX Torque | 37.9 | 36.9 | 37.4 | 36.4 |
| MIN Torque | 7.0 | 7.0 | 6.8 | 7.0 |
| Δ Torque | 30.9 | 29.9 | 30.6 | 29.4 |
| Tensile Strength (MPa) | 22.5 | 23.0 | 23.3 | 23.1 |
| Elongation @ Break (%) | 558 | 567 | 564 | 577 |
| 100% Modulus | 1.99 | 2.03 | 2.12 | 2.07 |
| 300% Modulus | 10.5 | 10.5 | 11.1 | 10.3 |
| Hardness Room Temp | 63.5 | 63.7 | 65.1 | 66.3 |
| Hardness 100° C. | 56.7 | 55.6 | 55.8 | 54.4 |
| Rebound Room Temp (%) | 46.0 | 42.8 | 41.9 | 39.7 |
| Rebound 100° C. (%) | 61.0 | 61.7 | 53.4 | 54.5 |
| Strebler to Itself | | | | |
| 95° C. (N) | 160 | 167 | 112 | 115 |
| DIN Abrasion | 116 | 100 | 91 | 81 |
| E' @ 60° C. (MPa) | 14.9 | 14.5 | 15.3 | 13.7 |
| Tan Δ @ 60° C. | .084 | .086 | .145 | .140 |

Samples 8 and 10 are controls which contain conventional processing oils, whereas Samples 9 and 11 contain stearyl stearate ester. Sample 8 is the control for Sample 9 and Sample 10 is the control for Sample 11. In both cases, the samples containing stearyl stearate (9 and 11) after heat treatment exhibit improved DIN abrasion as compared to their individual controls.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition comprising thermomechanically mixing the rubber composition while maintaining a rubber temperature in a range of from 160° C. to 190° C. for a period of time ranging from 4 to 8 minutes, wherein said rubber composition is (i) 100 parts by weight of at least one sulfur vulcanizable elastomer containing olefinic unsaturation;
   (ii) 10 to 250 phr of a filler selected from the group consisting of silica, carbon black and mixtures thereof; and
   (iii) 0.5 to 50 phr of an ester of the formula:

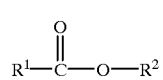

I wherein $R^1$ is selected from the group consisting of alkyls having from 16 to 18 carbon atoms and alkenyls having from 16 to 18 carbon atoms; and $R^2$ is selected from the group consisting of alkyls having from 12 to 22 carbon atoms.

2. The method of claim 1 wherein $R^1$ is an alkenyl having 17 carbon atoms and $R^2$ is an alkyl having 18 carbon atoms.

3. The method of claim 1 wherein ester is present in an amount ranging from 1 to 30 phr.

4. The method of claim 1 wherein said filler is carbon black.

5. The method of claim 1 wherein said filler is silica.

6. The method of claim 1 wherein said sulfur vulcanizable elastomer containing olefinic unsaturation is selected from the group consisting of natural rubber, neoprene, polyisoprene, butyl rubber, polybutadiene, styrene-butadiene copolymer, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

7. The method of claim 1 wherein a sulfur containing organosilicon compound is present and is of the formula:

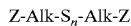

in which Z is selected from the group consisting of

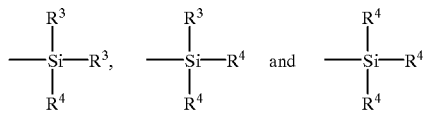

where $R^3$ is an alkyl group of 1 to 4 carbon atoms, cyclohexyl or phenyl;

$R^4$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

8. The method of claim 7 wherein said sulfur containing organosilicon compound is present in an amount ranging from 1 to 20 phr.

9. The method of claim 1 wherein said rubber composition is thermomechanically mixed while maintaining a rubber temperature in a range of from 160° C. to 190° C. for a period of time ranging from 5 to 7 minutes.

10. The method of claim 1 wherein said filler is from 20 to 100 phr.

\* \* \* \* \*